United States Patent
Harmon et al.

(10) Patent No.: US 11,753,086 B2
(45) Date of Patent: Sep. 12, 2023

(54) RAMP SYSTEM FOR VEHICLE WITH EXTENDABLE CARGO BED

(71) Applicant: Ford Global Technologies, LLC, Dearborn, MI (US)

(72) Inventors: Michael John Harmon, Northville, MI (US); Ryan Mathew Sandor, North Wales, PA (US); Matthew B. Rutman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/673,873

(22) Filed: Feb. 17, 2022

(65) Prior Publication Data
US 2023/0257032 A1    Aug. 17, 2023

(51) Int. Cl.
*B62D 33/027* (2006.01)
*B60P 1/43* (2006.01)

(52) U.S. Cl.
CPC .......... *B62D 33/0273* (2013.01); *B60P 1/431* (2013.01); *B60P 1/433* (2013.01)

(58) Field of Classification Search
CPC ..... B62D 33/02; B62D 33/0273; B60P 1/431; B60P 1/433; B60P 1/435
USPC ............................ 296/26.09, 26.1, 26.11, 61
See application file for complete search history.

(56) References Cited

U.S. PATENT DOCUMENTS

| | | | | |
|---|---|---|---|---|
| 4,900,217 A | * | 2/1990 | Nelson | B60P 1/431 14/71.1 |
| 7,488,025 B1 | * | 2/2009 | Roberson | B60P 1/433 296/61 |
| 7,549,692 B2 | * | 6/2009 | Washington | B62D 33/0273 296/61 |
| 7,967,356 B2 | | 6/2011 | Stackpole | |
| 7,976,264 B1 | * | 7/2011 | Pope | B60P 1/431 414/537 |
| 8,857,880 B2 | | 10/2014 | Kalergis et al. | |
| 9,067,525 B1 | | 6/2015 | Ninov et al. | |
| 9,073,475 B2 | * | 7/2015 | Chastain, Jr. | B60P 1/435 |
| 9,738,203 B2 | | 8/2017 | Michaud | |
| 10,017,092 B1 | | 7/2018 | Chastain, Jr. et al. | |
| 10,350,972 B2 | * | 7/2019 | Azzouz | B60J 5/00 |
| 11,530,001 B2 | * | 12/2022 | Williams | B62D 33/0273 |
| 2007/0237614 A1 | * | 10/2007 | Johnson | B60P 1/431 414/467 |
| 2008/0106058 A1 | * | 5/2008 | Demick | B60R 3/002 14/71.1 |
| 2009/0039675 A1 | * | 2/2009 | King | B60P 3/423 296/182.1 |
| 2013/0094931 A1 | * | 4/2013 | Bluhm | B60P 1/431 414/523 |
| 2014/0356117 A1 | * | 12/2014 | Barger | A61B 6/02 29/428 |

(Continued)

*Primary Examiner* — Jason S Morrow
(74) *Attorney, Agent, or Firm* — Vichit Chea; Carlson, Gaskey & Olds, P.C.

(57) ABSTRACT

A cargo bed system of a vehicle includes a bed floor assembly of a cargo bed. The bed floor assembly is configured to transition back-and-forth between a standard bed position and an extended bed position. A ramp assembly moves together with the bed floor assembly back-and-forth between the standard bed position and the extended bed position. The ramp assembly is configured to move back-and-forth between a stowed position and a deployed position.

18 Claims, 4 Drawing Sheets

(56) References Cited

U.S. PATENT DOCUMENTS

| | | | |
|---|---|---|---|
| 2015/0367768 A1* | 12/2015 | Verwys | B60P 1/43 |
| | | | 414/537 |
| 2016/0059763 A1* | 3/2016 | Sindoni, Jr. | B60P 1/431 |
| | | | 414/537 |
| 2016/0236724 A1* | 8/2016 | Borges Filho | B60P 3/40 |
| 2021/0276473 A1 | 9/2021 | Carter | |
| 2022/0289312 A1* | 9/2022 | Aquila | B60R 5/02 |

* cited by examiner

RAMP SYSTEM FOR VEHICLE WITH EXTENDABLE CARGO BED

TECHNICAL FIELD

This disclosure relates generally to ramp system used in connection with a cargo bed of a vehicle and, in particular, a cargo bed that can be extended.

BACKGROUND

Some vehicles, such as pickup trucks, include a cargo bed. Users utilize cargo beds to carry various types of cargo. The cargo bed can be located behind a passenger compartment of the vehicle. A tailgate can enclose an aft end of the cargo bed.

SUMMARY

In some aspects, the techniques described herein relate to a cargo bed system of a vehicle, including: a bed floor assembly of a cargo bed, the bed floor assembly configured to transition back-and-forth between a standard bed position and an extended bed position; and a ramp assembly that moves together with the bed floor assembly back-and-forth between the standard bed position and the extended bed position, the ramp assembly configured to move back-and-forth between a stowed position and a deployed position.

In some aspects, the techniques described herein relate to a cargo bed system, wherein the ramp assembly is movable back-and-forth between the stowed position and the deployed position when the bed floor assembly is in the standard bed position, wherein the ramp assembly is movable back-and-forth between the stowed position and the deployed position when the bed floor assembly is in the extended bed position.

In some aspects, the techniques described herein relate to a cargo bed system, wherein the ramp assembly includes a first ramp section and a second ramp section that is extendable and retractable relative to the first ramp section.

In some aspects, the techniques described herein relate to a cargo bed system, wherein the ramp assembly is retracted beneath the bed floor assembly when the ramp assembly is in the stowed position.

In some aspects, the techniques described herein relate to a cargo bed system, wherein the ramp assembly includes a first ramp section and a second ramp section that is extendable and retractable relative to the first ramp section, the second ramp section retracted beneath both the first ramp section and the bed floor assembly when the ramp assembly is in the stowed position.

In some aspects, the techniques described herein relate to a cargo bed system, wherein the second ramp section is slidably coupled to the first ramp section.

In some aspects, the techniques described herein relate to a cargo bed system, wherein the first ramp section is slidable and pivotably coupled to the bed floor assembly.

In some aspects, the techniques described herein relate to a cargo bed system, further including an actuator that drives extension and retraction of the bed floor assembly.

In some aspects, the techniques described herein relate to a cargo bed system, further including a tailgate having a first door and a second door, the first door configured to pivot about a first vertically extending axis back and forth between a closed position and a fully open position, the second door configured to pivot about a second vertically extending axis back and forth between a closed position and a fully open position.

In some aspects, the techniques described herein relate to a cargo bed system, wherein the first door provides a driver side wall for an extended portion of the bed floor assembly when the bed floor assembly is in the extended bed position, wherein the second door provides a second side wall for an extended portion of the bed floor assembly when the bed floor assembly is in the extended bed position.

In some aspects, the techniques described herein relate to a cargo bed system, further including a first gate pivotably connected to the first door, and a second gate pivotably connected to the second door, the first gate and the second gate configured to enclose an aft end of the cargo bed when the bed floor assembly is in the extended bed position.

In some aspects, the techniques described herein relate to a cargo bed system, further including a pivotable section and a slidable section of the bed floor assembly, the pivotable section disposed vertically against a front wall of the cargo bed when the bed floor assembly is in the standard bed position, the pivotable section disposed horizontally when the bed floor assembly and an extended bed position.

In some aspects, the techniques described herein relate to an extendable cargo bed accessing method, including: transitioning a bed floor assembly for a cargo bed of a vehicle from a standard bed position and an extended bed position; and moving a ramp assembly together with the bed floor assembly during the transitioning, the ramp assembly movable from a stowed position to a deployed position when the bed floor assembly is in the standard bed position and when the bed floor assembly is in the extended bed position.

In some aspects, the techniques described herein relate to a method, further including sliding the bed floor assembly back-and-forth between the standard bed position and the extended bed position.

In some aspects, the techniques described herein relate to a method, wherein the ramp assembly is nested beneath the bed floor assembly when the ramp assembly is in the stowed position.

In some aspects, the techniques described herein relate to a method, further including deploying the ramp assembly by withdrawing a first ramp section and a second ramp section of the ramp assembly from beneath the bed floor assembly, and by withdrawing the second ramp section from beneath the first ramp section.

In some aspects, the techniques described herein relate to a method, further including, during the transitioning, pivoting a pivotable section of the bed floor assembly relative to a slidable section of the bed floor assembly.

In some aspects, the techniques described herein relate to a method, further including, when the bed floor assembly is in the extended bed position, enclosing a driver side of an extended portion of the bed floor assembly using a first door of a tailgate, and enclosing a passenger side of the extended portion using a second door of the tailgate.

In some aspects, the techniques described herein relate to a method, further including, when the bed floor assembly is in the extended bed position, enclosing an aft end of the extended portion, with a first gate that is pivotably connected to the first door, and a second gate that is pivotably connected to the second door.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1A:
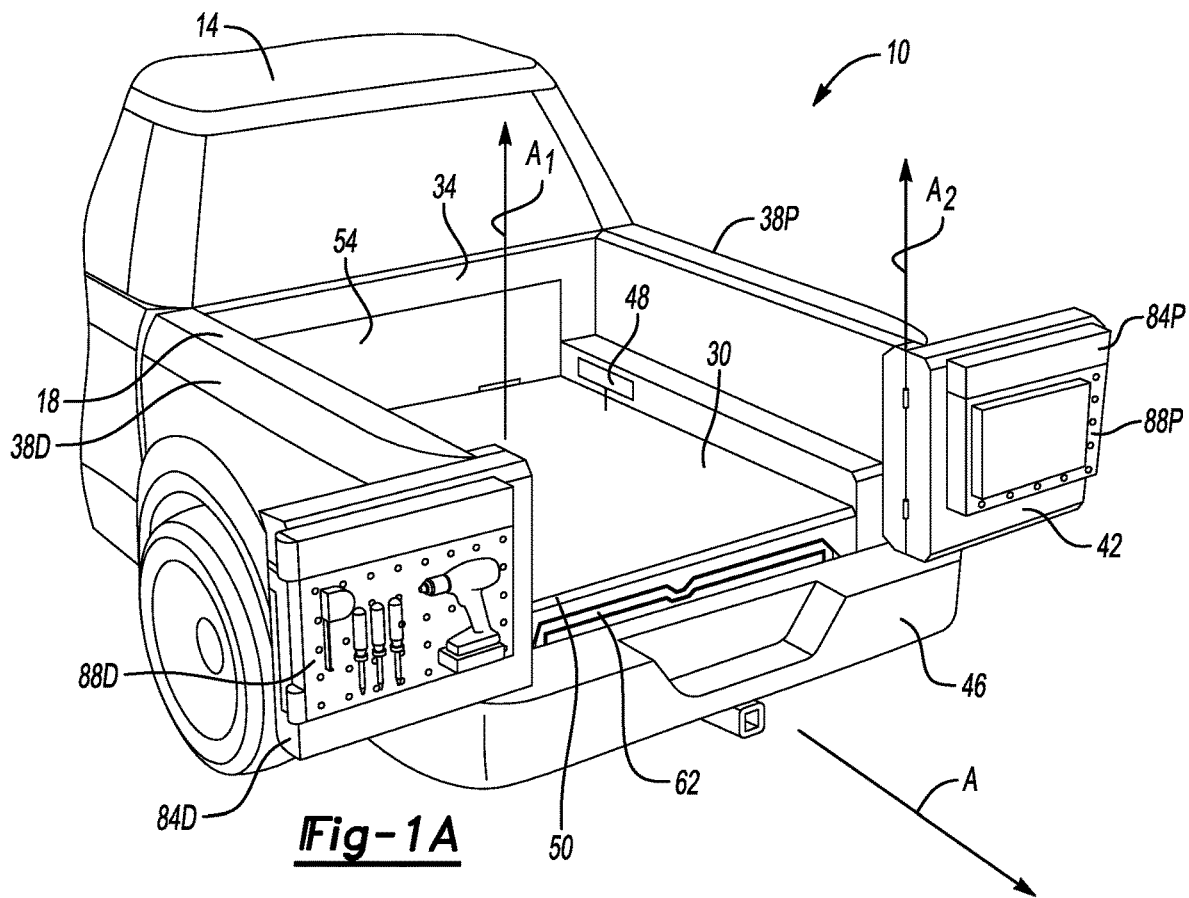
FIG. 1A illustrates a vehicle with a bed floor assembly in a standard bed position and a ramp assembly in a stowed position according to an exemplary embodiment of the present disclosure.

This disclosure details a ramp assembly used with an extendable cargo bed of a vehicle. A bed floor assembly can be extended to provide an extended portion of the cargo bed. The ramp assembly can be used when the cargo bed is extended and when the cargo bed is not extended.

With reference to FIGS. 1A-1E, a vehicle 10 includes a passenger compartment 14 and a cargo bed 18 that is aft the passenger compartment 14 along a longitudinal axis A of the vehicle 10.

In the exemplary embodiment, the vehicle 10 is a pickup truck. The vehicle 10 could be another type of vehicle in another example, such as a car, van, sport utility vehicle, etc. The vehicle 10 has a unibody architecture. In another embodiment, the vehicle 10 could have a body-on-frame architecture.

The example vehicle 10 is an electrified vehicle. In particular, the vehicle 10 is a battery electric vehicle. In another example, the vehicle 10 could be another type of electrified vehicle, such as a plug-in hybrid electric vehicle (PHEV), or a conventional vehicle.

The example vehicle 10 includes an electrified powertrain capable of applying a torque from an electric machine (e.g., an electric motor) to drive a pair of wheels. The vehicle 10 can include a traction battery pack, which powers the electric machine and, potentially, other electrical loads of the vehicle 10. The powertrain of the vehicle 10 may electrically propel the wheels either with or without the assistance of an internal combustion engine.

Generally, the cargo bed 18 is provided by a bed floor assembly 30, a front wall 34, a first bed wall assembly 38D, a second bed wall assembly 38P, and a tailgate assembly 42.

The example bed floor assembly 30 is configured to transition back-and-forth between a standard bed position shown in FIG. 1A and an extended bed position shown in FIGS. 1B-1E. In the extended bed position, the cargo bed 18 has an extended portion 44 protruding aft of a rear bumper 46 of the vehicle.

At least one actuator 48, such as a linear screw actuator, can be used to move the bed floor assembly 30 back-and-forth between the standard bed position and the extended bed position. The at least one actuator 48 is shown schematically in FIGS. 1A-1C. The at least one actuator 48 can drive extension and retraction of the bed floor assembly 30.

In some examples, the bed floor assembly 30 can include bores, such as threaded bores, that can be engaged by connectors to help tie down cargo, for example.

Figure 1B:
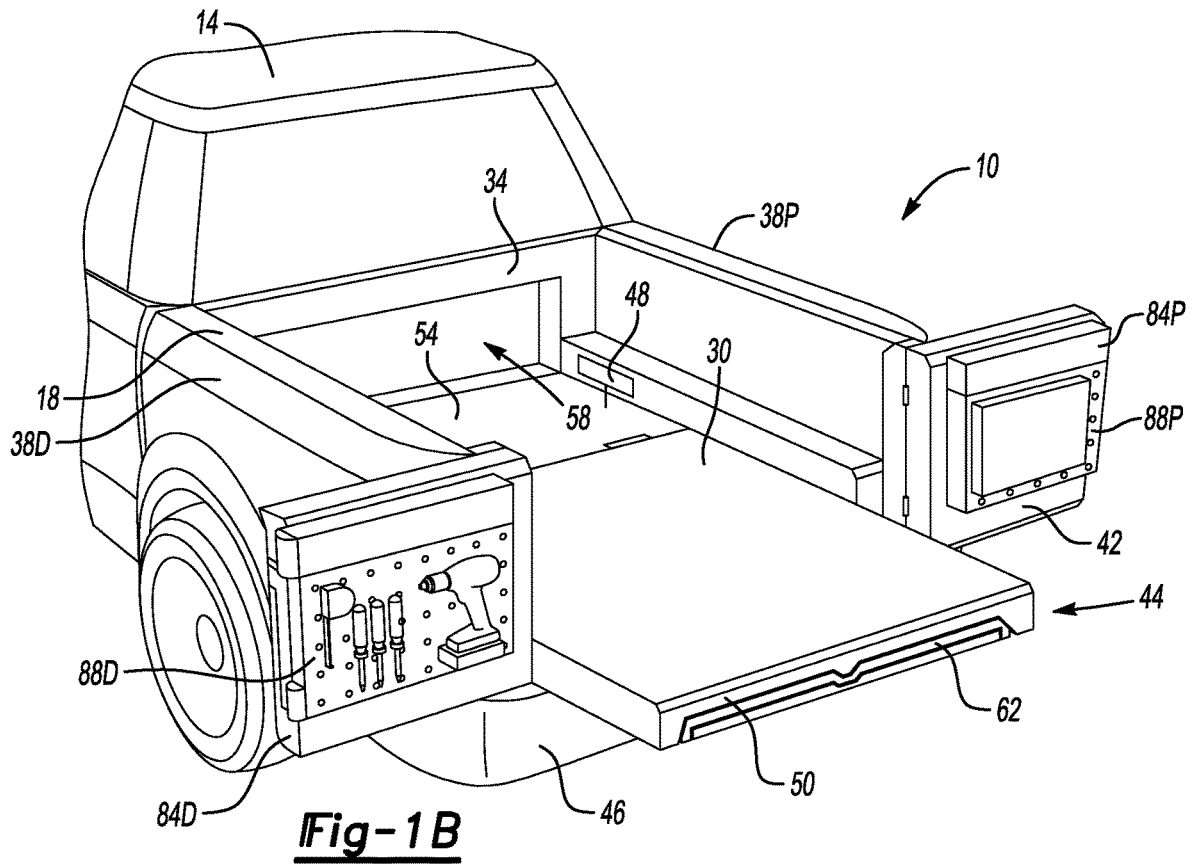
FIG. 1B illustrates the vehicle of FIG. 1A after the bed floor assembly has been transitioned to an extended bed position.
Figure 1C:
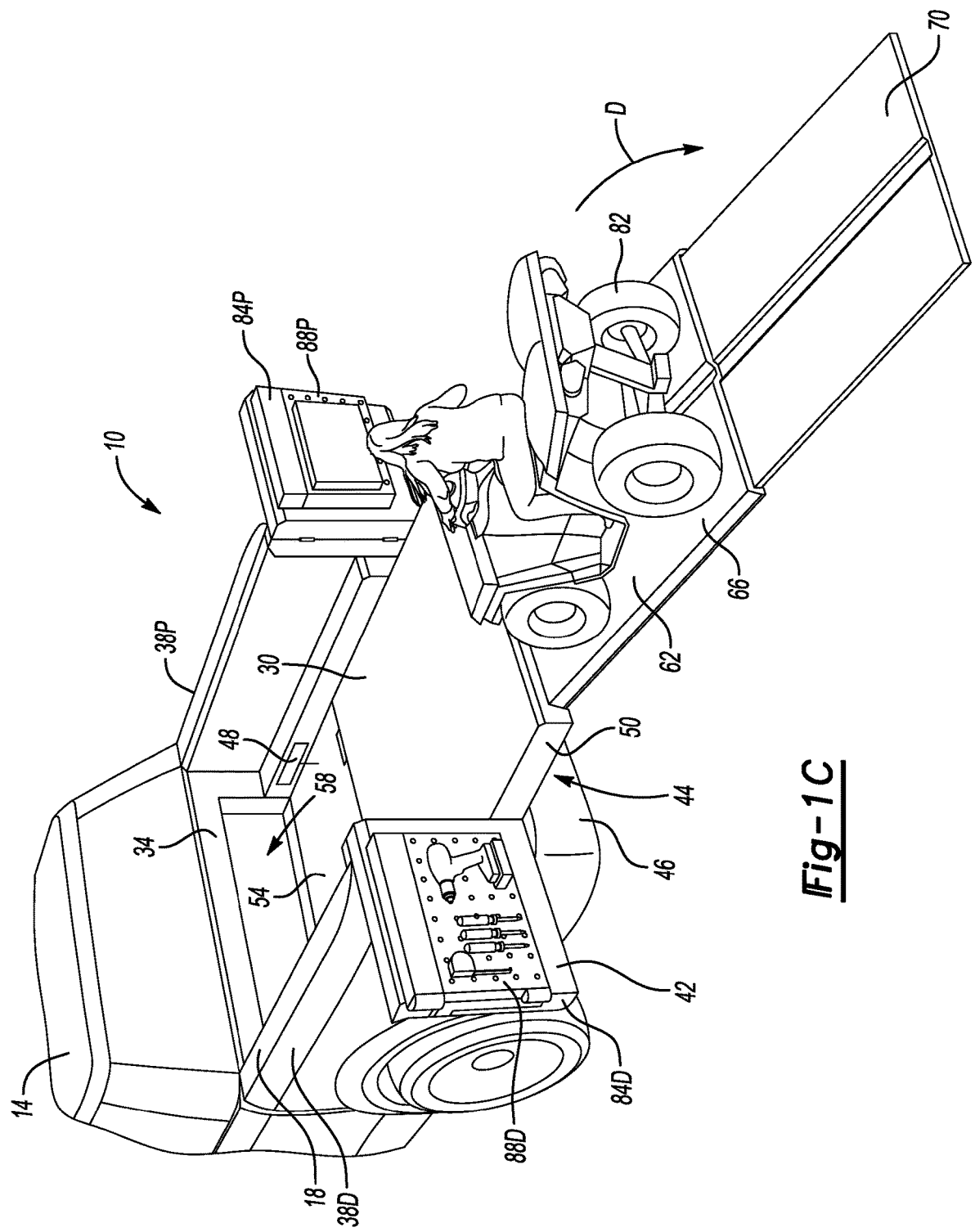
FIG. 1C illustrates the vehicle of FIG. 1B after the ramp assembly has been moved to a deployed position and is being used to load cargo.
Figure 1D:
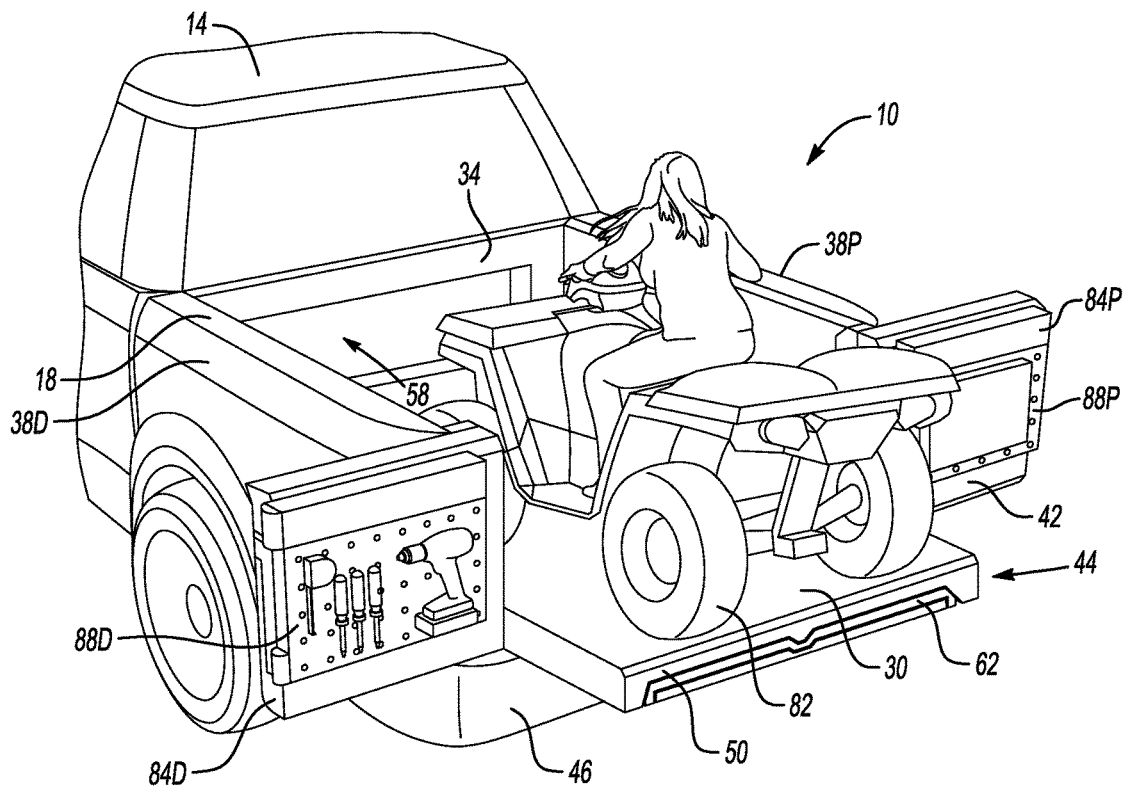
FIG. 1D illustrates the vehicle of FIG. 1C after the cargo is loaded and the ramp assembly moved back to the stowed position.
Figure 1E:
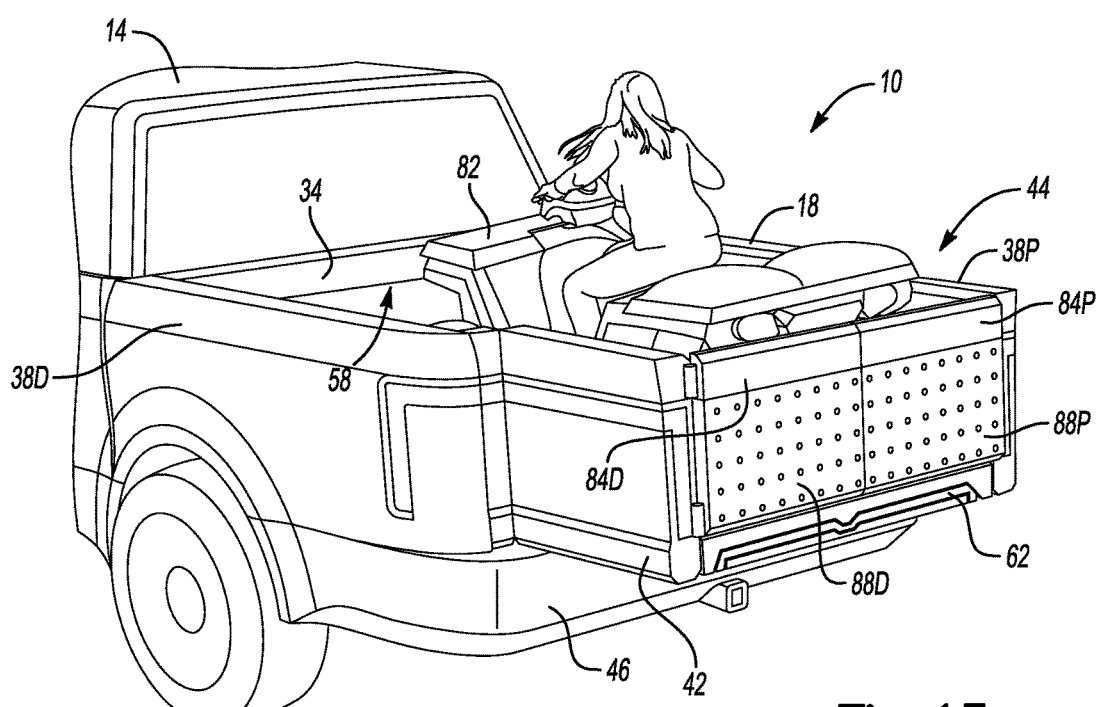
FIG. 1E illustrates the vehicle of FIG. 1D after first and second doors and first and second gates have been used to enclose an extended portion of the cargo bed.
Figure 2:
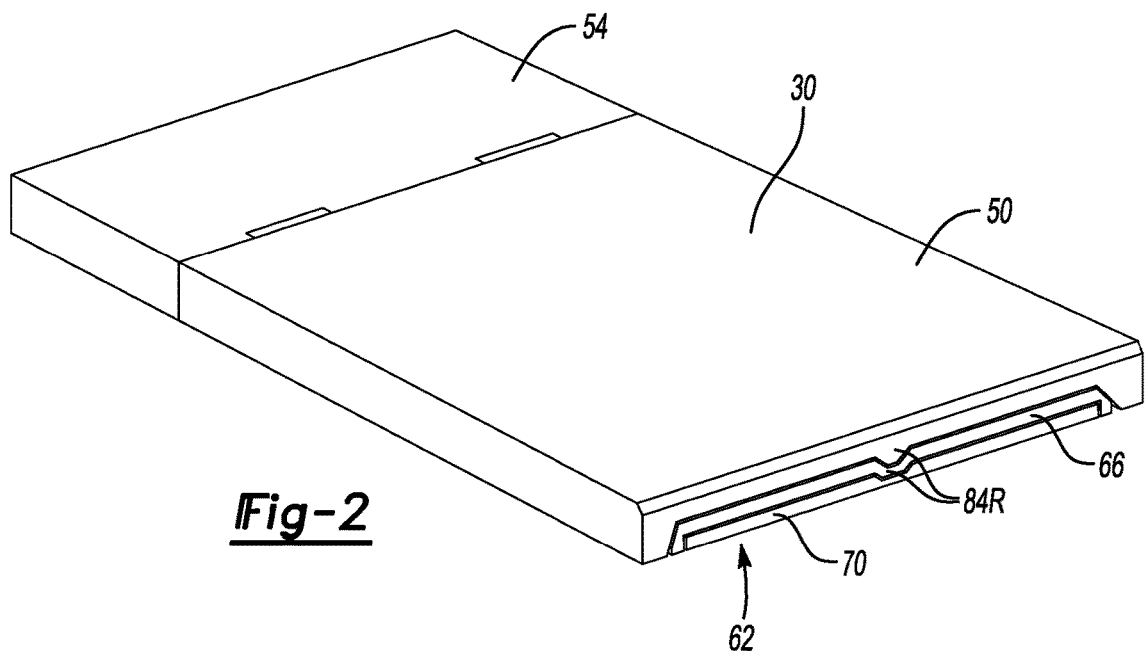
FIG. 2 illustrates a perspective view of the ramp assembly in the deployed position.
Figure 3:
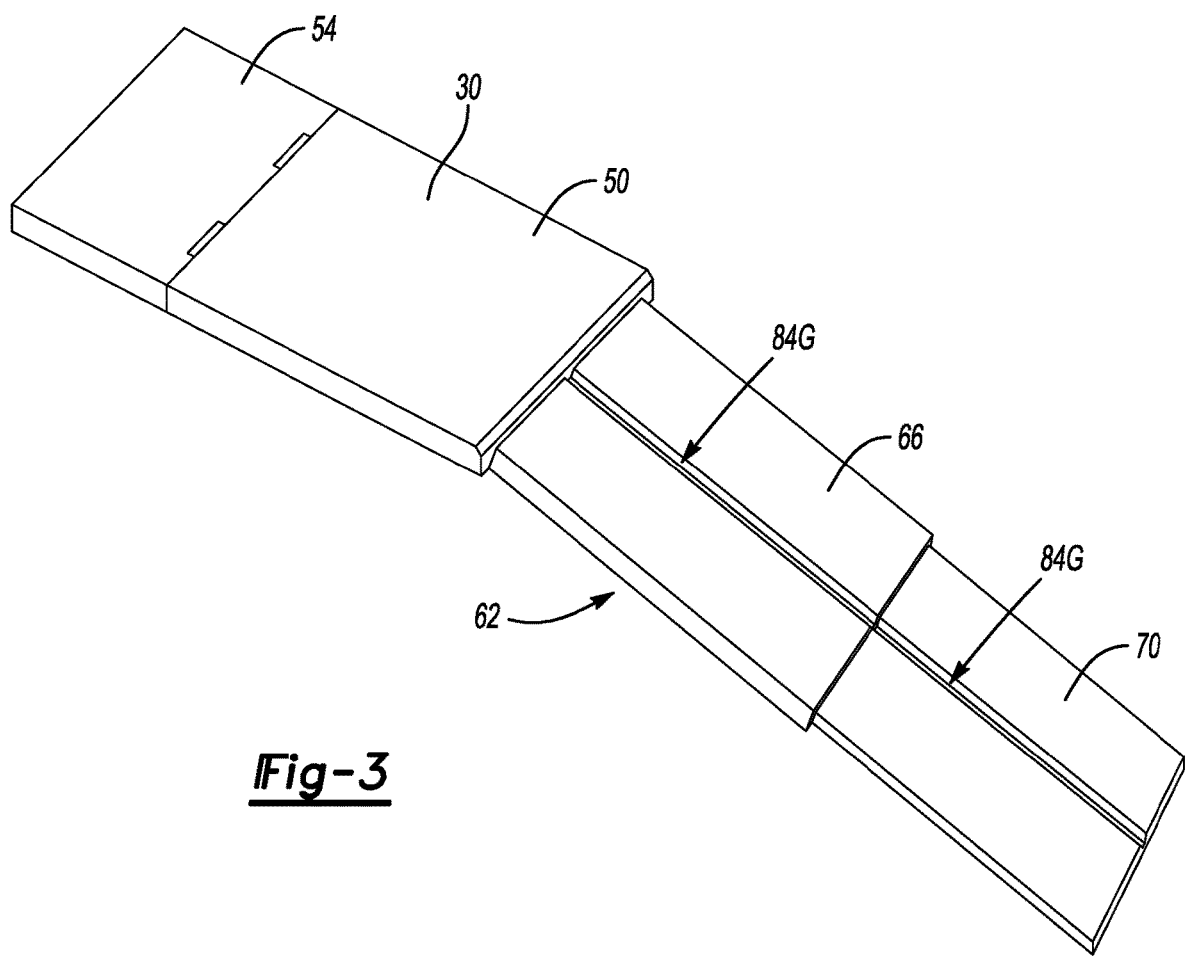
FIG. 3 illustrates a perspective view of the ramp assembly in the stowed position.

With reference now to FIGS. 2 and 3 and continuing reference to FIGS. 1A-1E. The example bed floor assembly 30 includes a slidable section 50 and a pivotable section 54 that are pivotably connected to each other. When the bed floor assembly 30 is in the standard bed position, the pivotable section 54 is oriented vertically and is disposed within a recess 58 of the front wall 34. As the bed floor assembly 30 is transitioned to the extended bed position, the slidable section 50 is moved rearward causing the pivotable section 54 to pivot into a horizontal orientation where the pivotable section 54 is coplanar with the slidable section 50. Vertical and horizontal, for purposes of this disclosure, are with reference to ground and a general orientation of the vehicle 10 during operation.

A ramp assembly 62 moves together with the bed floor assembly 30 back-and-forth between the standard bed position and the extended bed position. The ramp assembly 62 is movable back-and-forth between a stowed position (shown in FIGS. 1A, 1B, 1D, and 1E) and a deployed position (shown in FIG. 1C).

In FIG. 1C, the ramp assembly 62 is shown in a deployed position while the bed floor assembly 30 is in the extended bed position. The ramp assembly 62 can also be moved from the stowed position to the deployed position when the bed floor assembly 30 is in the standard bed position.

In this example, the ramp assembly 62 is in the stowed position when the bed floor assembly 30 is transitioned between the standard bed position and the extended bed position.

The ramp assembly 62, in the exemplary embodiment, includes a first ramp section 66 and a second ramp section 70. When the ramp assembly 62 is in the in stowed position, the first ramp section 66 and the second ramp section 70 are telescopically retracted beneath the bed floor assembly 30. In particular, the second ramp section 70 nests within the first ramp section 66, which nests within the bed floor assembly 30.

The second ramp section 70 is slidably coupled to the first ramp section 66. The second ramp section 70 is extendable and retractable relative to the first ramp section 66. The second ramp section 70, in this example, is not configured to pivot relative to the first ramp section 66.

The first ramp section 66 is slidably and pivotably coupled to the bed floor assembly 30. The first ramp section 66 could, for example, be coupled to the bed floor assembly 30 through a slider and rail system. The sliders move within rails to permit sliding of the first ramp section 66. The sliders can include pivots so that, when the first ramp section 66 is fully extended, the first ramp section 66 can pivot in a direction D from a horizontal orientation to the deployed position as shown in FIG. 1C.

To move the ramp assembly 62 from the stowed position of FIGS. 1A and 1B, a user can pull rearward on the second ramp section 70. This withdraws the first ramp section 66 and the second ramp section 70 from beneath the bed floor assembly 30. When the first ramp section 66 and the second ramp section 70 are fully extended horizontally, the user can permit the ramp assembly 62 to pivot in the direction D until the second ramp section 70 contacts ground. The slide and pivot mechanisms can include stops that prevents the first ramp section 66 and the second ramp section 70 from being pulled out of the bed floor assembly 30. The user can then move cargo, such an ATV or motor cycle 82, into the cargo bed 18. The surfaces of the first ramp section 66 and the second ramp section 70 can be patterned to help with traction as the cargo is moved over the first ramp section and the second ramp section 70.

As can be appreciated, the extended portion 44 provided by the bed floor assembly 30 facilitates accommodating more cargo than when the bed floor assembly 30 is in the standard bed position. A user can also use the bed floor assembly 30 as a worksurface that can be accessed from three sides when the bed floor assembly 30 is in the extended position.

In this example, undersides of the bed floor assembly 30 and the first ramp section 66 and the second ramp section 70 include alignment ribs 84R received with corresponding alignment grooves 84G of the first ramp section 66 and the second ramp section 70. The alignment ribs 84R ride within along a corresponding one of the alignment grooves 84G when the ramp assembly 62 is moved between the stowed position and the extend position. This approach helps to keep the first ramp section 66 and the second ramp section 70 aligned.

The example tailgate assembly 42 includes a split tailgate having a first door 84D that can pivot about a vertical axis $V_1$ and a second door 84P that can pivot about a vertical axis $V_2$. The first door 84D is on a driver side of the vehicle 10, and the second door 84P is on the passenger side of the vehicle 10. The first door 84D and the second door 84P are similarly sized in this example. The first door 84D and the second door 84P each account for about fifty-percent of the tailgate assembly 42. The first door 84D is configured to pivot about the axis $V_1$ back-and-forth between a closed position and a fully open position (FIGS. 1A-1D). The second door 84P is configured to pivot about a second vertically extending axis $V_2$ back-and-forth between a closed position and a fully open position.

As shown in FIG. 1E, the first door 84D and the second door 84P can be moved to a partially open positions. In the example partially open positions, the first door 84D provides a driver side wall for the extended portion 44, and the second door 84P provides a passenger side wall for the extended portion 44.

In this example, a first gate 88D is pivotably coupled to the first door 84D, and a second gate 88P is pivotably coupled to the second door 84P. The first gate 88D and the second gate 88P can provide storage locations for hanging tools, accessories, and other items. The first gate 88D and the second gate 88P can also be pivoted to the position of FIG. 1E. In this position, the first gate 88D and the second gate 88P enclose an aft end of the cargo bed 18 when the bed floor assembly 30 is the extended position.

In another the tailgate assembly 42 includes a single door that pivots about a vertical axis. This door could open to provide an opening in a central area of the tailgate assembly.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A cargo bed system of a vehicle, comprising:
a bed floor assembly of a cargo bed, the bed floor assembly configured to transition back-and-forth between a standard bed position and an extended bed position;
a ramp assembly that moves together with the bed floor assembly back-and-forth between the standard bed position and the extended bed position, the ramp assembly configured to move back-and-forth between a stowed position and a deployed position, the ramp assembly movable back-and-forth between the stowed position and the deployed position when the bed floor assembly is in the standard bed position, the ramp assembly movable back-and-forth between the stowed position and the deployed position when the bed floor assembly is in the extended bed position; and
a pivotable section and a slidable section of the bed floor assembly, the pivotable section and the slidable section pivotably connected to each other, the pivotable section disposed vertically against a front wall of the cargo bed when the bed floor assembly is in the standard bed position, the pivotable section disposed horizontally when the bed floor assembly is in an extended bed position.

2. The cargo bed system of claim 1, wherein the ramp assembly includes a first ramp section and a second ramp section that is extendable and retractable relative to the first ramp section.

3. The cargo bed system of claim 1, wherein the ramp assembly is retracted beneath the bed floor assembly when the ramp assembly is in the stowed position.

4. The cargo bed system of claim 1, wherein the ramp assembly includes a first ramp section and a second ramp section that is extendable and retractable relative to the first ramp section, the second ramp section retracted beneath both the first ramp section and the bed floor assembly when the ramp assembly is in the stowed position.

5. The cargo bed system of claim 4, wherein the second ramp section is slidably coupled to the first ramp section.

6. The cargo bed system of claim 5, wherein the first ramp section is slidable and pivotably coupled to the bed floor assembly.

7. The cargo bed system of claim 1, further comprising an actuator that drives extension and retraction of the bed floor assembly.

8. The cargo bed system of claim 1, further comprising a tailgate having a first door and a second door, the first door configured to pivot about a first vertically extending axis back and forth between a closed position and a fully open position, the second door configured to pivot about a second vertically extending axis back and forth between a closed position and a fully open position.

9. The cargo bed system of claim 8, wherein the first door provides a driver side wall for an extended portion of the bed floor assembly when the bed floor assembly is in the extended bed position, wherein the second door provides a second side wall for an extended portion of the bed floor assembly when the bed floor assembly is in the extended bed position.

10. The cargo bed system of claim 8, further comprising a first gate pivotably connected to the first door, and a second gate pivotably connected to the second door, the first gate and the second gate configured to enclose an aft end of the cargo bed when the bed floor assembly is in the extended bed position.

11. An extendable cargo bed accessing method, comprising:
    transitioning a bed floor assembly for a cargo bed of a vehicle from a standard bed position and an extended bed position, and, during the transitioning, pivoting a pivotable section of the bed floor assembly relative to a slidable section of the bed floor assembly, the pivotable section pivotably connected directly to the slidable section; and
    moving a ramp assembly together with the bed floor assembly during the transitioning, the ramp assembly movable from a stowed position to a deployed position when the bed floor assembly is in the standard bed position and when the bed floor assembly is in the extended bed position.

12. The method of claim 11, further comprising deploying the ramp assembly by withdrawing a first ramp section and a second ramp section of the ramp assembly from beneath the bed floor assembly, and by withdrawing the second ramp section from beneath the first ramp section.

13. The method of claim 11, further comprising, when the bed floor assembly is in the extended bed position, enclosing a driver side of an extended portion of the bed floor assembly using a first door of a tailgate, and enclosing a passenger side of the extended portion using a second door of the tailgate.

14. The method of claim 13, further comprising, when the bed floor assembly is in the extended bed position, enclosing an aft end of the extended portion, with a first gate that is pivotably connected to the first door, and a second gate that is pivotably connected to the second door.

15. The cargo bed system of claim 1, wherein, when the bed floor assembly is in the standard bed position, the pivotable section is orientated vertically and disposed within a recess of a front wall of the cargo bed.

16. The cargo bed system of claim 1, wherein, when the bed floor assembly is in the extended bed position, the pivotable section is coplanar with the slidable section.

17. The method of claim 11, wherein the pivotable section is disposed vertically against a front wall of the cargo bed when the bed floor assembly is in the standard bed position, wherein the pivotable section is disposed horizontally when the bed floor assembly is in the extended bed position.

18. The method of claim 17, wherein the pivotably section is disposed within a recess of the front wall when the bed floor assembly is in the standard bed position.

* * * * *